POWER-DRIVEN LAWN MOWER WITH PIVOTAL FRAME CONSTRUCTION
Filed June 23, 1961 2 Sheets-Sheet 1
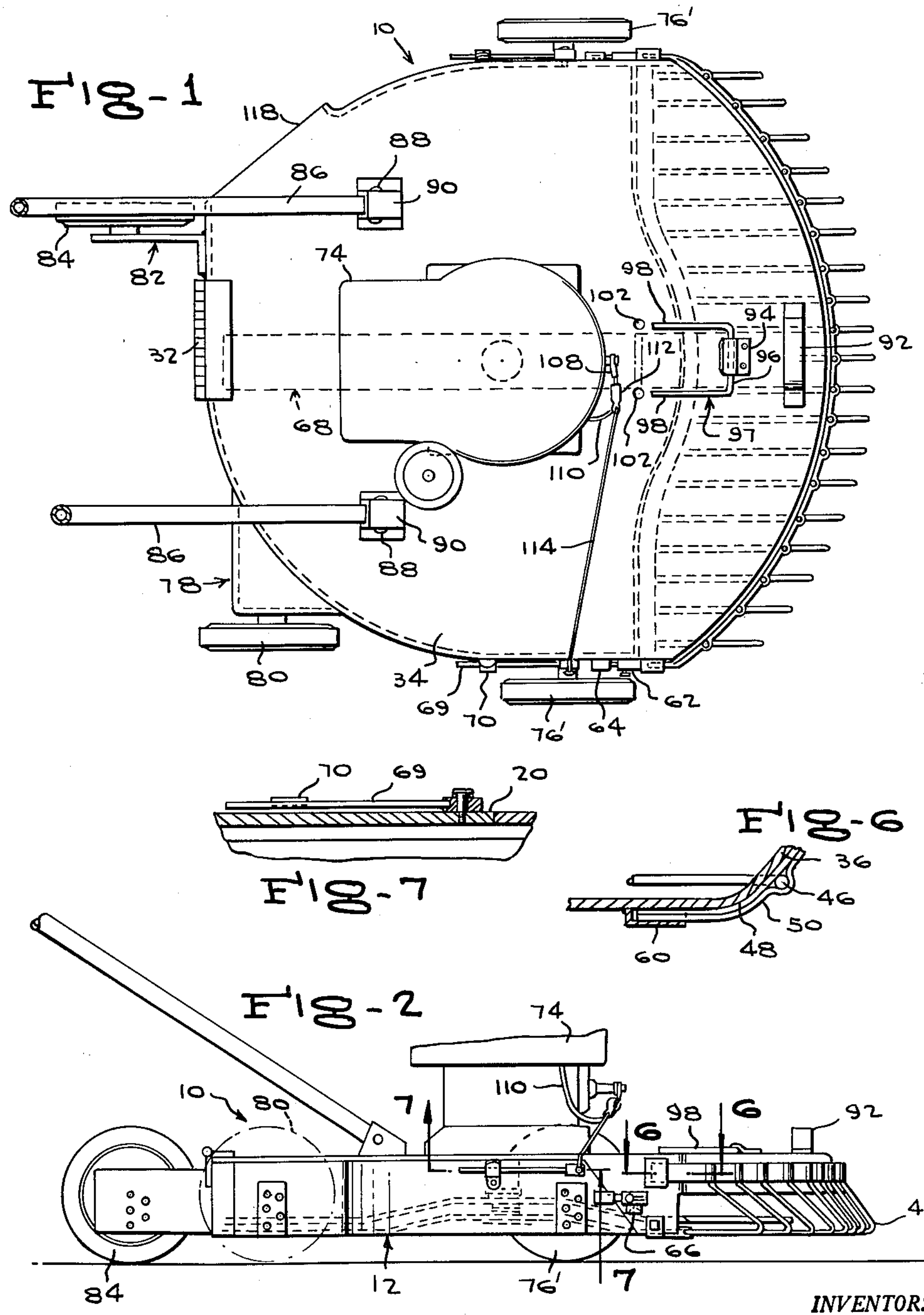
INVENTORS
CHARLES A. RIDENOUR,
EVERETT R. LITTLE, &
BY FRANCIS D. IRWIN
McMorrow, Berman & Davidson
ATTORNEYS POWER-DRIVEN LAWN MOWER WITH PIVOTAL FRAME CONSTRUCTION
Filed June 23, 1961 2 Sheets-Sheet 2
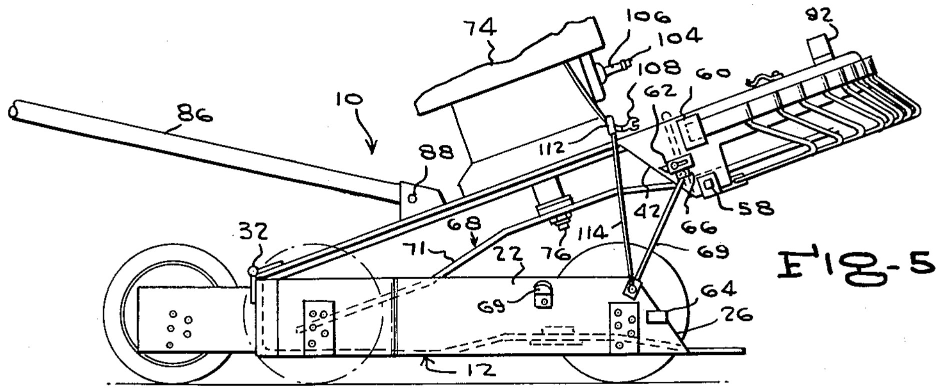
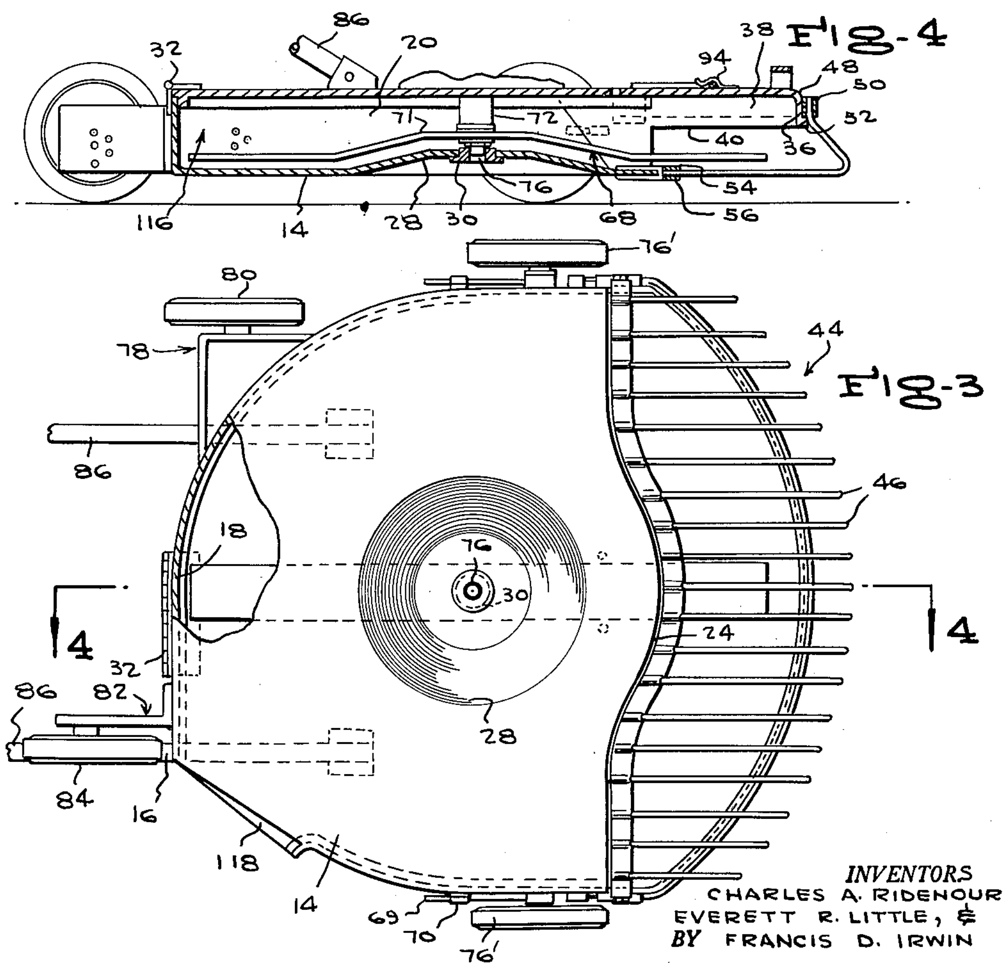
INVENTORS
CHARLES A. RIDENOUR,
EVERETT R. LITTLE, &
BY FRANCIS D. IRWIN
McMorrow, Berman & Davidson
ATTORNEYS United States Patent Office 3,057,140

Patented Oct. 9, 1962

3,057,140

POWER-DRIVEN LAWN MOWER WITH PIVOTAL FRAME CONSTRUCTION

Charles Amos Ridenour, 100 4th St., Apt. J, Chester, W. Va., and Francis D. Irwin, East Liverpool, and Everett R. Little, Bergholz, Ohio Filed June 23, 1961, Ser. No. 119,112
7 Claims. (Cl. 56—25.4)

This invention relates to the general class of power-driven vehicles or apparatus and, more specifically, the instant invention pertains to power-driven lawn mowers.

One of the primary objects of this invention is to provide a power-driven lawn mower having a wheeled chassis to which is pivotally connected a motor and cutting blade assembly housing for facilitating repairs to the mower and the cleaning thereof.

Another object of this invention is to provide means automatically operable upon the pivotal movement of the above-referred to housing for breaking the ignition circuit to the motor, thereby preventing accidental or inadvertent actuation thereof which could lead to physical injury.

A further object of this invention, and as a further safety precaution, is to provide releasable blade-locking means to effectively prevent the rotation thereof during repair, replacement, or mower cleaning operations.

Still another object of this invention is to provide a power-driven lawn mower with a quick detachable guard.

A still further object of this invention is to provide a grass-collecting and discharge chamber for power-driven lawn mowers wherein the cuttings will not ball up or accumulate in such a manner as to interfere with the rotation of the cutting blade.

This invention contemplates, as a still further object thereof, the provision of a power-driven lawn mower of the type generally described supra, wherein the lawn mower is non-complex in construction and assembly, comparatively inexpensive to manufacture, and durable in use.

Other and further objects and advantages of the instant invention will become more manifest from a consideration of the following specification when read in conjunction with the annexed drawings, in which:

FIGURE 1 is a top plan view of a power-driven lawn mower constructed in accordance with this invention;

FIGURE 2 is a side elevational view of the power-driven lawn mower shown in FIGURE 1;

FIGURE 3 is a bottom plan view of the power-driven lawn mower shown in FIGURE 1, parts thereof being broken away to illustrate more clearly the construction thereof;

FIGURE 4 is a detail longitudinal cross-sectional view, FIGURE 4 being taken substantially on the horizontal plane of line 4—4 of FIGURE 3, looking in the direction of the arrows;

FIGURE 5 is a side elevational view of the power-driven lawn mower illustrating the motor and blade assembly housing in its pivoted position;

FIGURE 6 is an enlarged fragmentary detail cross-sectional view, FIGURE 6 being taken substantially on the horizontal plane of line 6—6 of FIGURE 2, looking in the direction of the arrows; and FIGURE 7 is an enlarged fragmentary detail cross-sectional view, FIGURE 7 being taken substantially on the horizontal plane of line 7—7 of FIGURE 2, looking in the direction of the arrows.

Referring now more specifically to the drawings, reference numeral 10 designates, in general, a power-driven lawn mower constructed in accordance with the teachings of this invention. The mower 10 is seen to comprise a wheeled chassis 12 which includes a base or bottom plate 14 (see FIGURES 3 and 4) having a substantially straight rear end portion 16 and curvilinear sides from the marginal edges of which arise the back wall 18 and curvilinear side walls 20, 22. The front edge of the plate 14 is substantially straight with the exception of its central portion 24 which is convex. The walls 20, 22, at their forward ends, are cut at an acute angle, as at 26. The base plate 14 has a dished-up or substantially concave central portion 28 in which is seated a journal or bearing 30.

To the rear or back wall 18 is hingedly connected at 32 a cover member 34. The cover member 34 is substantially ovate and has a forward end projecting beyond the front edge of the base or bottom plate 14. The forward or projecting end of the cover member 34 is formed with a depending front flange 36 integral with side flanges 38, the front and side flanges being cut out, as at 40, to leave a forward open end. The side flanges 38, at their respective inner ends 42, are also cut on an angle complementing the forward ends 26 of the side walls 20, 22.

To the forward or front flange 36 is secured a guard 44 which is seen to comprise a plurality of laterally-spaced substantially parallel wire elements 46 having one of their respective ends secured between a pair of plates 48, 50, the plate 50 normally resting upon a forwardly-projecting flange 52. The wires 46 project forwardly and downwardly and are then reverted to extend below the forward end of the cover member 34. At their lower terminal ends, the wire elements 46 are embraced between a pair of plates 54, 56 which normally overlap the forward end of the plate 14. At their respective opposed ends, the plates 54, 56 are bent upwardly to engage the exterior sides of the flanges 38 adjacent their respective inner ends, and are secured thereto by means of bolts 58. The terminal ends of the plates 48, 50 are releasably received within sockets 60 also secured to the flanges 38. Latch means 62, 64 on the flanges 38 and side walls 20, 22 cooperate to hold the cover member 34 in its closed or lowermost position.

Below each latch means 62 and fixedly secured to the flanges 40 is a substantially rectangular lug 66 (see FIGURE 5) which is adapted to be engaged by one end of hold rods 69 and comprise means whereby the cover member 34 may be held in its open upwardly-pivoted position while cleaning the mower 10 or effecting repairs to, or replacement of the cutting blade 68. The rods 69, when not in their operative positions, are retained in clips 70 secured to the side walls 20, 22.

The blade 68 is upwardly bowed, as at 71, and complements the contour of the base plate 14 in vertically-spaced relation relative thereto. As is seen in the drawings, the blade 68 is fixedly connected to the drive shaft 72 of a motor 74 fixedly mounted on the upper side of the cover member 34. The drive shaft 72 extends through the cover member 34 to position the blade 68 in proximity with respect to the base plate 14, and the drive shaft 72 has an outer projecting end 76 of reduced diameter which is adapted to be received in the bearing 30, whereby the shaft and blade are prevented from excessive vibration.

The side walls 20, 22 are provided with front wheels 76', and from the side wall 22 adjacent the rear of the mower 10 laterally projects a bracket 78 which serves as mounting means for a rear wheel 80. From the back wall 18, adjacent the other side of the mower 10, extends an angle member 82 in which the other of the rear wheels 84 is journaled.

Handle members 86 are pivotally connected at 88 within the housings 90 mounted on the upper side of the cover member 34, the handles 86 being adapted for manual manipulation to propel and steer the mower 10. Also secured to the cover member 34 adjacent its forward end is an inverted U-shaped handle 92 to provide means to facilitate the raising of the cover member 34. Disposed rearwardly of the handle 92 and secured to the cover member 34 is a clip 94 that normally releasably receives the bight 96 of a U-shaped safety element 97 having a pair of laterally-spaced, elongated, substantially parallel arms 98. The distance between the arms 98 is sufficient to span the width of an arm of the blade 68 and is movable into and out of such position by extension through openings 102 that extend transversely through the cover member 34. With the U-shaped safety element so disposed, the blade 68 is held against rotation.

Still another safety factor is provided and reference is made to ignition circuit breaking apparatus (see FIGURES 1, 2 and 5). In this instance, the center post 104 of the spark plug 106 is connected by a detachable clip 108 with the ignition wire 110. A connector 112 is secured to an electrically insulated portion of the wire 110 adjacent the clip 108, and the connector 112 is fixedly secured to one end of a flexible cord 114 having its other end connected to the side wall 22 adjacent the forward end thereof. The length of the cord 114 is such that as the cover member 34 is pivoted to its open position, the cord 114 will become taut and exercises a force on the wire 110 to cause the clip 108 to ride off the center post 104.

The back wall 18, side walls 20, 22 and the cover member 34 define a chamber 116 having a forwardly-opening end. Adjacent the rear wheel 84, the side wall 22 is provided with a material discharge opening 118.

The base plate 14 taken together with its convex portion 28 and the blade 68 tend to cooperate in such a manner that as the blade 68 rotates in a clockwise direction, as viewed in FIGURE 1, the centrifugal force generated by the blade causes the mowed grass to whirl within the compartment 116 without appreciable accumulation and the "balling up" of the material to the extent that the mowed grass interferes with the action of the blade 68.

Having described and illustrated one embodiment of this invention in detail, it will be understood that the same is offered merely by way of example, and that this invention is to be limited only by the scope of the appended claims.

What is claimed is:

1. A power lawn mower comprising a wheeled chassis having a base plate, side and rear walls rising from the marginal edges of said base plate, and a cover member extending across said walls, means pivotally connecting said cover member to one of said walls, motor means fixedly secured to said cover member and having a drive shaft extending transversely therethrough, and a cutting blade fixedly secured to said shaft, said blade being disposed intermediate said base plate and said cover member.

2. A power lawn mower comprising a wheeled chassis having a base plate, side and rear walls rising from the marginal edges of said base plate, a cover member extending across said walls in vertically-spaced relation relative to said base plate, and means pivotally connecting said cover member to one of said walls, said base plate, walls and cover member cooperating to form a forwardly-opening compartment, one of said side walls adjacent said rear wall having a material discharge opening formed therein, an internal combustion motor mounted on said cover member and having a drive shaft extending transversely therethrough, a cutting blade fixedly secured to said shaft and disposed between said base plate and said cover member, a wire guard extending across said open end of said compartment, and means detachably connecting said guard with said chassis.

3. A power-driven lawn mower comprising a wheeled chassis including a base plate, side and rear walls rising from the marginal edges of said base plate, and a cover member extending across said walls in vertically-spaced relation relative to said base plate, means pivotally connecting said cover member to one of said walls, said base plate, walls and cover member cooperating to form a forwardly-opening compartment, one of said side walls adjacent said rear wall having a material discharge opening formed therein, an internal combustion engine mounted on said cover member and having a drive shaft extending transversely therethrough, a cutting blade fixedly secured to said shaft and disposed between said base plate and said cover member, an ignition circuit for said engine, and means operable when said cover member is pivoted away from said base plate to break said circuit.

4. A power-driven lawn mower as defined in claim 3, and means for holding said cover member in a pivoted position away from said base plate, said means comprising a rod for each of said side walls, each of said rods having an end thereof pivotally connected with said side walls, respectively, and each of said rods being pivotal to cause the other ends thereof to engage said cover member.

5. A power-driven lawn mower as defined in claim 4, and means detachably connected to said cover member for extension therethrough to span an arm of said blade to hold said blade stationary when said cover member is in its tilted position away from said base plate.

6. A power-driven lawn mower as defined in claim 5, and latch means cooperating between said cover member and said side walls for preventing inadvertent pivotal movement of said cover member relative to said base plate.

7. A power-driven lawn mower as defined in claim 6, and a wire guard extending across said open end of said compartment.

References Cited in the file of this patent

UNITED STATES PATENTS

| | | |
|---|---|---|
| 2,153,771 | Orr | Apr. 11, 1939 |
| 2,675,660 | Barnard | Apr. 20, 1954 |
| 2,977,694 | Higby | Apr. 4, 1961 |
| 2,993,321 | Hester | July 25, 1961 |